United States Patent
Seaman

(10) Patent No.: US 6,248,155 B1
(45) Date of Patent: Jun. 19, 2001

(54) COMBINATION HUMIDIFIER AND AIR PURIFIER

(75) Inventor: John W. Seaman, Sheboygan Falls, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 0 days.

(21) Appl. No.: 09/374,447

(22) Filed: Aug. 13, 1999

(51) Int. Cl.[7] .................................. B01F 3/04; F24F 6/04
(52) U.S. Cl. ........................... 95/211; 95/214; 96/294; 96/300; 96/364; 261/99; 261/107; 261/DIG. 41
(58) Field of Search ........................ 261/99, 107, 104, 261/106, DIG. 15, DIG. 41; 55/500; 96/294, 300, 361, 364; 95/211, 214

(56) References Cited

U.S. PATENT DOCUMENTS

| | | | |
|---|---|---|---|
| 1,274,418 | * | 8/1918 | Hunt ...................................... 261/107 |
| 1,451,329 | * | 4/1923 | Dressler ................................ 261/99 |
| 1,702,804 | | 2/1929 | Winslow . |
| 2,164,763 | * | 7/1939 | Buck ..................................... 261/107 |
| 2,197,004 | * | 4/1940 | Myers ..................................... 96/364 |
| 2,387,473 | * | 10/1945 | Spitzka ................................... 96/294 |
| 2,530,535 | | 11/1950 | Mulhollen . |
| 3,006,436 | | 10/1961 | Starbuck et al. . |
| 3,619,988 | * | 11/1971 | Cornell, III ............................. 261/99 |
| 3,621,834 | * | 11/1971 | Keuls ................................... 261/107 |
| 3,757,494 | * | 9/1973 | Keuls ..................................... 261/99 |
| 4,788,013 | | 11/1988 | Kinney, Jr. et al. ..................... 261/24 |
| 5,143,655 | | 9/1992 | Chiu et al. ............................. 261/24 |
| 5,250,232 | | 10/1993 | Pepper et al. .......................... 261/24 |
| 5,480,588 | | 1/1996 | Tomasiak et al. ................... 261/72.1 |
| 5,578,113 | | 11/1996 | Glenn ....................................... 96/52 |

FOREIGN PATENT DOCUMENTS 35 07 544 A1 * 9/1986 (DE) ..................................... 261/99

* cited by examiner

Primary Examiner—C. Scott Bushey
(74) Attorney, Agent, or Firm—Michael Best & Friedrich LLP

(57) ABSTRACT

A humidifier/air purifier including a housing defining a water reservoir, an air inlet opening and an air outlet opening; a generally V-shaped wicking element in fluid communication with the reservoir; an air filter with a generally V-shaped air filter medium and a frame supporting the air filter medium mounted above the wicking element; and a blower for causing air flow through the air inlet opening, through the wicking element, through the air filter, and through the air outlet opening.

48 Claims, 3 Drawing Sheets

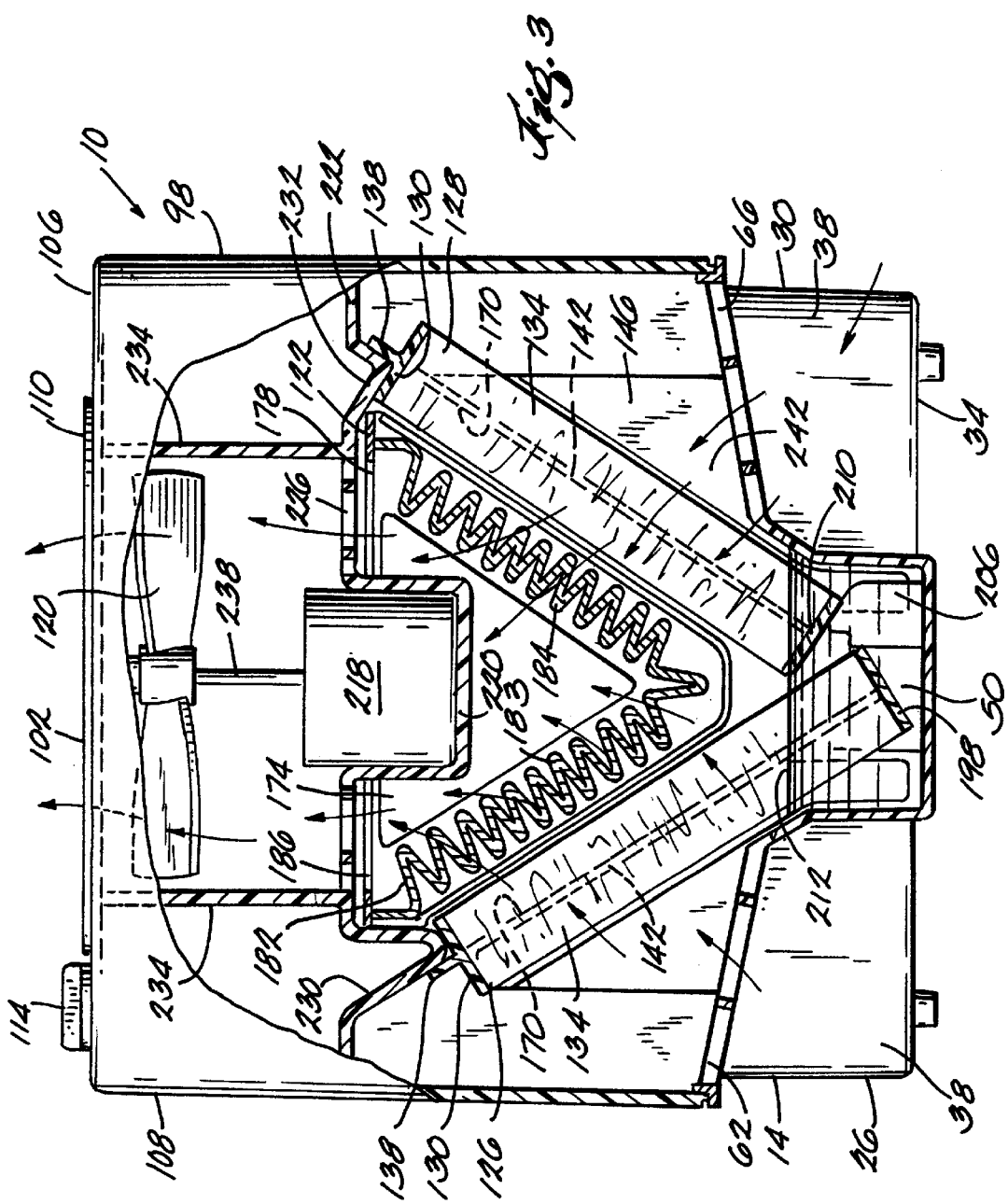

COMBINATION HUMIDIFIER AND AIR PURIFIER

BACKGROUND OF THE INVENTION

The invention relates to humidifiers and air purifiers, and more particularly to combination units having an evaporative wick and an air filter.

A known evaporative humidifier includes a stationary wicking element in fluid communication with a tank or reservoir of water. The wicking element absorbs water, which is transferred to the atmosphere as a vapor.

It is known to provide a combination air purifier and evaporative humidifier.

SUMMARY OF THE INVENTION

This invention provides a combination humidifier and air purifier with superior humidification capabilities and an air filtering function in one compact unit. It achieves the increased efficiency of an angled wicking element design. A wicking element can be angled to reduce the effective height of the wicking element, thereby decreasing gravitational resistance to the wicking action and increasing the water evaporation rate by approximately twenty percent.

This invention provides a V-shaped wicking element that essentially doubles the evaporative surface area of the wicking element in nearly the same physical space. The wicking element has a honeycomb or other suitable form and sits with only its bottom edge immersed in a trough of water. Wicking action causes water to saturate the wicking element, and air is passed through the wicking element to transfer water vapor to the atmosphere. The V-shaped wicking element can be formed from the combination of two of standard wicking elements known in the art. Thus, this portion of the invention may be realized without extensive retooling costs due to the reuse of previously designed elements.

The humidifier/air purifier further comprises an air filter to remove particulate matter from the atmosphere. This filter is V-shaped in the preferred embodiment and is fitted within the V-shaped wicking element. This space-saving technique allows the enlarged wicking element and the air filter to operate in a space very similar to that needed by a simple evaporative humidifier.

The humidifier/air purifier further comprises a blower for causing air flow through an air inlet opening, through the wicking element, through the air filter, and through the air outlet opening. Whereas previous air treatment devices have placed an air filter upstream in the air flow from the wicking element, this invention positions the air filter downstream of the wicking element to capture any mineral deposits that may be released by the wicking element if the humidifier/air purifier is being used improperly.

Other features and advantages of the invention are set forth in the following drawings, detailed description and claims.

BRIEF DESCRIPTION OF THE DRAWINGS

FIG. 3 is a partially cutaway cross-sectional view of the humidifier/air purifier taken along line 3—3 in FIG. 1, including an example of the flow paths air can take through the humidifier/air purifier.

Figure 1:
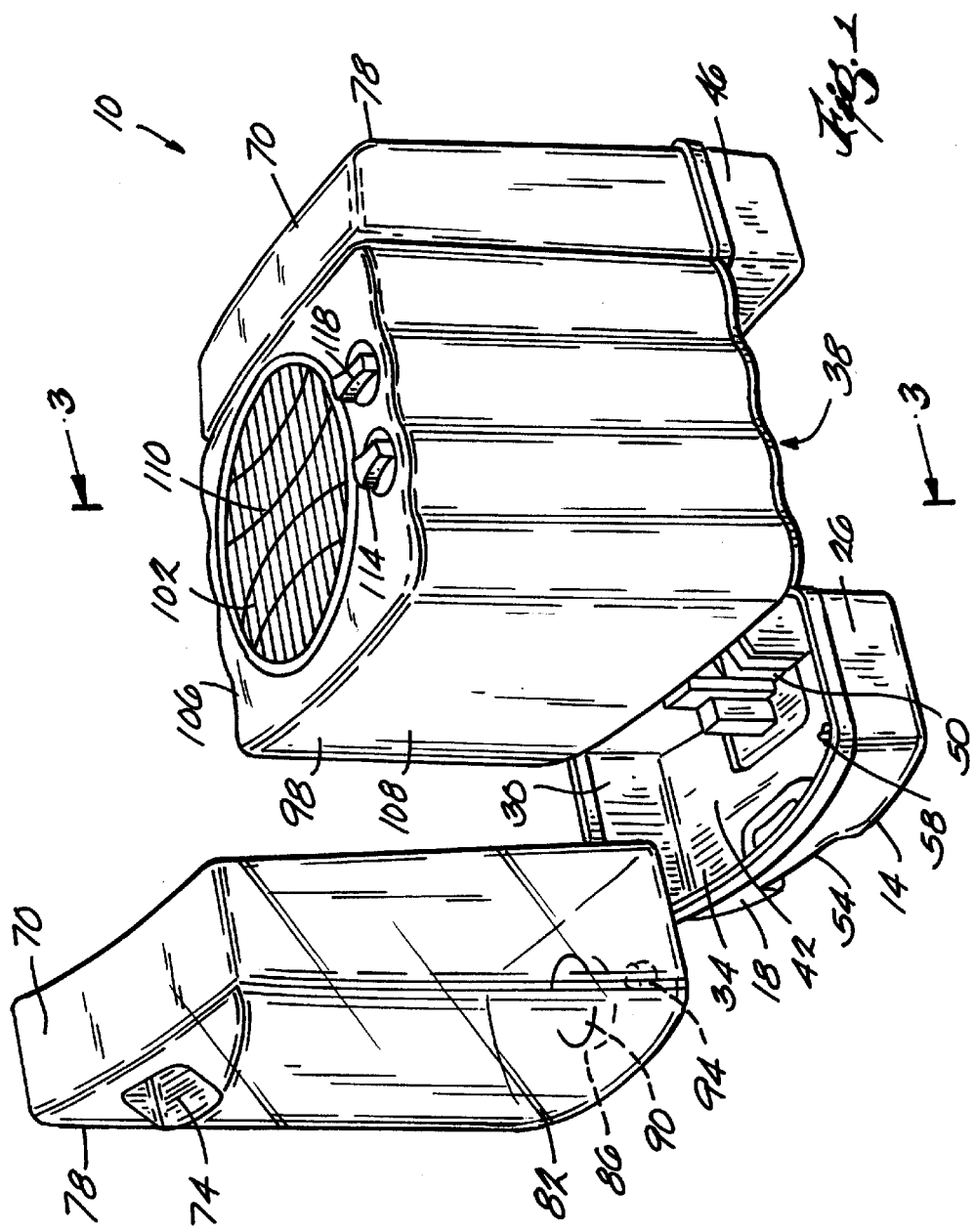
FIG. 1 is a perspective view of a humidifier/air purifier embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify steps of a method or process is simply for identification and is not meant to indicate that the steps should be performed in a particular order.

DETAILED DESCRIPTION OF THE PREFERRED EMBODIMENTS

A combination humidifier and air purifier 10 embodying the invention is illustrated in FIGS. 1–4. The humidifier/air purifier 10 has some elements similar to the humidifier described in U.S. Pat. No. 5,250,232, which is assigned to the assignee hereof, and which is herein incorporated by reference. The humidifier/air purifier 10 comprises abase 14 having opposite left and right walls 18, 22, and front, rear and bottom walls 26, 30, 34 extending between the left and right walls 18, 22. Both the front wall 26 and the rear wall 30 have therein air gaps 38 to allow air to pass under the humidifier/air purifier 10. The base 14 defines left and right reservoirs 42, 46 located adjacent left and right walls 18, 22, respectively. The bottom wall 34 also defines a center channel 50 that is in fluid communication with both the left and right reservoirs 42, 46. The center channel 50 extends longitudinally in a direction extending between the left and right walls 18, 22. Two handgrip recesses 54 are formed in the bottom wall 34 where it meets the left and right walls 18, 22, respectively. These recesses 54 accommodate the fingers of a user's hands to allow the user to lift the humidifier/air purifier 10.

Also formed in the bottom wall 34 in each reservoir 42, 46 is a tank valve opening peg or projection 58 that extends vertically from the bottom wall 34.

Front and rear air inlet grilles 62, 66 are formed in the base 14 adjacent the center channel 50. These grilles 62, 66 extend between the left and right reservoirs 42, 46, and form the upper limit of the front and rear wall air gaps 38.

The humidifier/air purifier 10 also includes two water tanks 70. Each tank 70 sits on the base 14 above a respective reservoir 42, 46. A handle 74 is formed in each tank 70 at its upper end 78. The tank bottom 82 includes an opening 86 that is used to refill the tank 70. The opening 86 is sealed during use with a cap 90. The tank bottom 82 also includes a standard outlet valve 94 through which water can exit the tank 70 into a reservoir 42, 46.

The humidifier/air purifier 10 further includes a cover 98 that sits on the base 14 between the two water tanks 70. An air outlet opening 102 is formed in the top wall 106 of the cover 98. The top wall sits atop generally vertical cover walls 108. The air outlet opening 102 is fitted with a generally circular outlet grille 110, which is rotatably attached to the cover 98.

Also located on the top wall 106 of the cover 98 are two control knobs 114, 118. The first control knob 114 can be used to adjust the speed of a fan 120 within the humidifier/ air purifier 10 and thus the volumetric air flow through the humidifier/air purifier 10. The second control knob 118 controls a humidistat (not shown) that measures humidity in the vicinity of the humidifier/air purifier 10. Under normal circumstances, when the humidity increase to a point above the setpoint of the humidistat, the humidifier/air purifier 10 is shut off. If the humidity falls below the setpoint of the humidistat, the humidifier/air purifier 10 is turned on. A power cord (not shown) to provide power to the fan enters the humidifier/air purifier 10 through the cover 98.

Figure 2:
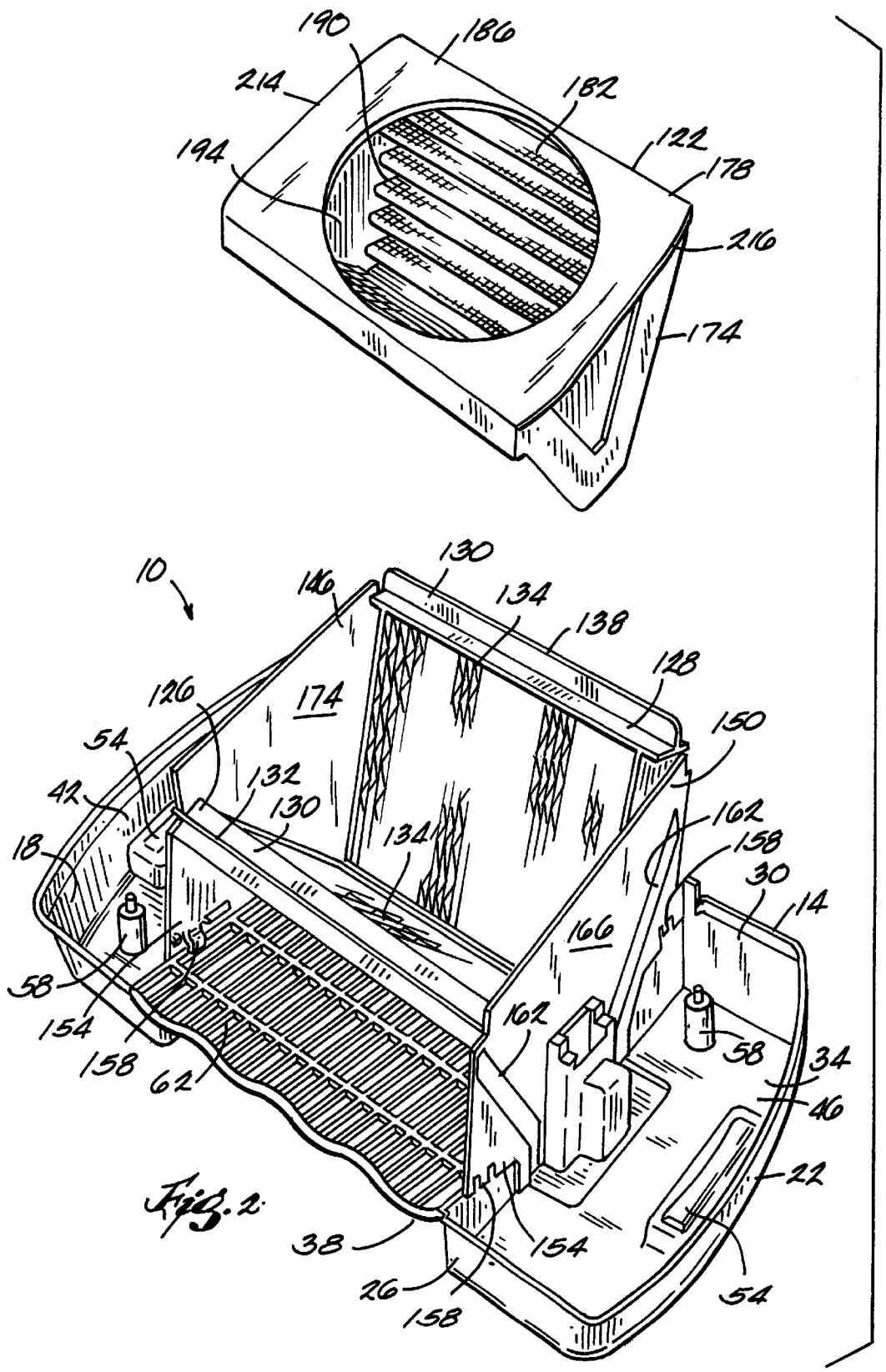
FIG. 2 is an exploded perspective view of the housing, wicking element, and air filter.

FIG. 2 is an exploded view of the humidifier/air purifier 10 with the water tanks 70 and the cover 98 removed, and an air filter 122 lifted out of the humidifier/air purifier 10. Also illustrated are first and second wicking elements 126, 128. Each wicking element 126, 128 is of a design known in the art that is substantially a rectangular parallelepiped and includes a plastic structural frame 130 and a pleated paper wicking medium 134. Any other compatible wicking element designs and other frame and wicking medium materials known in the art may be used. Each wicking element 126, 128 includes an upper tab 138 that is used as a handle for installing and removing the wicking element 126, 128 from the humidifier/air purifier 10. The wicking elements 126, 128 are designed to be easily replaced when they begin to lose effectiveness. Each wicking element 126, 128 also includes two side tabs 142 (shown in phantom in FIG. 3). The purpose of the tabs 142 is explained below.

Left and right side walls 146, 150 are removably attached to the base 14. The bottom edge 154 of each side wall 146, 150 includes two locking clips 158 that snap onto the base 14 to hold the side wall 146, 150 in place. Angled recesses 162 formed in each side wall 146, 150 from the outer face 166 of the side wall 146, 150 result in a shelf or ledge 170 (FIG. 3) on the inner face 174 of the side wall 146, 150. The shelves 170 angle downwardly and inwardly from the front 26 and rear 30 of the humidifier/air purifier 10. Each shelf 170 supports a wicking element side tab 142 such that the wicking element 126, 128 is parallel to the shelf 170. As a result, the wicking elements 126, 128 are also angled (preferably at an angle of approximately thirty degrees from vertical) downwardly and inwardly from the front 26 and rear 30 of the humidifier/air purifier 10 resulting in a V-shaped arrangement of the two wicking elements 126, 128.

The air filter 122 is generally shaped as a triangular prism with generally flat, triangular end walls 174 and a flat top wall 178. An air filter medium 182 has angularly-spaced portions 183, 184 (FIG. 3) that form the remaining two walls of the prism, resulting in an air filter 122 that is generally V-shaped. The top and end walls 178, 174 together form the frame 186 of the air filter 122. The frame 186 is preferably plastic, but may be made of any other compatible material known in the art. The frame 186 provides structural support to the air filter medium 182 to allow the filter medium 182 to retains its shape.

The air filter medium 182 is pleated to allow more of the medium 182 fit within the frame 186, thus increasing the effective surface area of the filter medium 182. The edges 190 of the medium 182 are glued to the frame 186 to maintain the shape of the filter medium 182, but other attachment mechanisms may be used. A generally circular hole 194 formed in the top wall 178 of the air filter 122 allows air to escape the air filter 122.

As best illustrated in FIG. 3, the generally V-shaped air filter 122 is adapted to fit within the V-shape arrangement of the wicking elements 126, 128, which allows a more compact humidifier/air purifier 10.

The bottom edge 198 of the wicking element 126 rests against the side of a wick support column 206. The bottom edge 210 of the wicking element 128 rests on top of the wick support column 206. The water level 212 is nominally below the elevation of the air inlet grilles 62, 66 but above the bottom edge 210 of the wicking element 128. The wicking elements 126, 128 are vertically offset to give the humidifier/air purifier 10 a smaller horizontal direction from the front wall 26 to the rear wall 30. The wicking medium 134 of each wicking element 126, 128 is in fluid communication with the water located in the center channel 50, which communicates with the reservoirs 42, 46.

The air filter 122 rests within the V-shape formed by the two wicking elements 126, 128. Specifically, the opposite ends 214, 216 (FIG. 2) of the top wall 178 of the frame 186 rest on top of the walls 146, 150 so that the filter 122 is actually suspended inside the V formed by the wicking elements 126, 128, with the air filter medium portions 183, 184 above the wicking elements 126, 128, respectively, as shown in FIG. 3.

Located above the air filter 122 and attached within the cover 98 is a horizontal partition 222. Horizontal partition 222 includes an internal grille 226 that allows air to flow upward from the air filter 122 through the horizontal partition 222, and projections or ribs 230, 232 that project downward from the horizontal partition 222. The projections or ribs 230, 232 generally contact the wicking elements 126, 128, respectively, to form a substantially airtight seal between the wicking elements 126, 128 and the horizontal partition 222.

A standard motor 218 is seated in a recess 220 in the horizontal partition 222 and is located substantially within the V-shape of the air filter 122, and consequently within the V-shape of the wicking elements 126, 128. Stated another way, at least half of the height of the motor 218 is below the top wall 178 of the air filter 122. This arrangement of the motor 218 fitting within the V-shape arrangement of the air filter 122 and wicking elements 126, 128 allows a more compact humidifier/air purifier 10. A cylindrical wall 234 extends between the horizontal partition 222 and the top wall 106 of the cover 98. The shaft 238 of the motor 218 is vertically-oriented and connects the motor 218 with the fan 120. The fan 120 is located within the cylindrical wall 234. The power cable and controls needed to run the motor are not shown for simplicity.

The cover walls 108, side walls 146, 150, horizontal partition 222, and cylindrical wall 234 define an air flow plenum 242 extends between the air inlet grilles 62, 66 and the air outlet opening 102. The wicking elements 126, 128 and air filter 122 are in the plenum 242. Air that enters through the air inlet grilles 62, 66 is channeled upwardly by cover walls 108 and side walls 146, 150. Above the horizontal partition 222, the cylindrical wall 234 channels the air. Air is substantially prevented from bypassing the wicking elements 126, 128 and the air filter 122 by projections or ribs 230 on horizontal partition 222, and by side walls 146, 150.

In operation, the water tanks 70 are filled, their openings 86 are sealed by caps 90, and the tanks 70 are placed on the base 14. The valve control pegs 58 cause the tank outlet valves 94 to open, thus allowing water to flow into the reservoirs 42, 46 and the center channel 50. As is known in the art, the water rises to the level of the valves 94. Water in the reservoirs 42, 46 wicks up through the wicking elements 126, 128, causing the wicking medium 134 to become saturated with water.

When the humidity in the vicinity of the humidifier/air purifier 10 is detected by the humidistat as being below the humidistat setpoint, the motor 218 and thus the fan 120 are caused to run. An air flow is created through the humidifier/air purifier 10. Air flows through the gaps 38 in the front and rear walls 26, 30 of the base 14 and enters the humidifier/air purifier 10 through the air inlet grilles 62, 66. The air then passes through the wicking elements 126, 128, causing water that has saturated the wicking elements 126, 128 to evaporate and become entrained in the air flow. Water continues to saturate the wicking elements 126, 128 by the same wicking action, resulting in a continuous flow of water into the wicking elements 126, 128 during operation. As water is absorbed into the wicking elements 126, 128 from the center channel 50, the water level of the center channel 50 and thus the reservoirs 42, 46 drops. This water is replaced automatically by a gravity flow of water out of the water tanks 70.

Humidity-containing air leaves the wicking elements 126, 128 and passes through the air filter medium 182 of the air filter 122, where particulate matter is removed from the air. The air flow continues through the opening 194 in the top wall 178 of the air filter 122, past the motor 218, through the internal grille 226, within cylindrical wall 234, past fan 120, and exits the humidifier/air purifier 10 through the outlet grille 110 in the top wall 106 of the humidifier/air purifier 10. Once the humidity in the vicinity of the humidifier/air purifier 10 as detected by the humidistat rises above the humidistat setpoint, the motor 218 and fan 120 are turned off and air flow through the humidifier/air purifier 10 ceases.

The first control knob 114 is used to vary the volumetric air flow through the humidifier/air purifier 10. Adjusting the fan speed results in a variance in the humidification per unit of time that the humidifier/air purifier 10 operates. A higher fan speed results in greater humidification per unit of time.

The water tanks 70 are easily refillable when they become empty, and the wicking elements 126, 128 and air filter 122 are easily replaceable when they no longer effectively perform their function.

Various features of the invention are set forth in the following claims.

What is claimed is:

1. A method of providing an air filter for a humidifier including a housing defining a water reservoir, an air inlet opening and an air outlet opening, a generally V-shaped wicking element in fluid communication with said reservoir, and a blower for causing air flow through said air inlet opening, through said wicking element, and through said air outlet opening; said method comprising the steps of:
    providing an air filter comprising a generally V-shaped air filter medium and a frame supporting said air filter medium; and
    mounting said air filter within said V-shaped wicking element.

2. The method of claim 1, wherein said wicking element includes first and second angularly spaced wicking element portions, wherein said providing step includes providing said filter medium with first and second angularly spaced filter medium portions, and wherein said mounting step includes mounting said air filter so that said first and second filter medium portions extend above said first and second wicking element portions, respectively.

3. A humidifier comprising:
    a housing defining a water reservoir, an air inlet opening and an air outlet opening;
    a generally V-shaped wicking element including first and second angularly spaced wicking element portions which are in fluid communication with said reservoir, wherein said first wicking element portion extends further into said reservoir than said second wicking element portion; and
    a blower for causing air flow through said air inlet opening, through said wicking element, and through said air outlet opening.

4. The humidifier of claim 3, wherein said housing includes a base defining said reservoir, said air inlet opening and a second air inlet opening, wherein said reservoir is between said air inlet openings, and wherein said first and second wicking element portions extend above said first-mentioned and second air inlet openings, respectively.

5. The humidifier of claim 3, wherein said wicking element portions are generally rectangular parallelepipeds.

6. The humidifier of claim 5, wherein said wicking element portions are substantially identical and each includes a generally rectangular frame surrounding a wicking medium.

7. The humidifier of claim 3, wherein each of said wicking element portions has a lower end and extends at an angle of approximately thirty degrees from vertical, and wherein said lower end of said first wicking element portion extends below said lower end of said second wicking element portion.

8. The humidifier of claim 3, wherein said blower includes a motor mounted within said V-shaped wicking element.

9. The humidifier of claim 3, said humidifier/air purifier further comprising an air filter mounted above said wicking element.

10. The humidifier of claim 9, wherein said air flow follows a path through said air inlet opening, said wicking element, said air filter, and said air outlet opening.

11. The humidifier of claim 3, wherein said housing includes a base defining said air inlet opening and said reservoir, said humidifier further comprising an air flow plenum which extends between said air inlet opening and said air outlet opening, in which said wicking element is located, and which is defined in part by generally parallel first and second side walls, and wherein each side wall has a lower end removably attached to said base.

12. The humidifier of claim 3, wherein said housing further includes a cover and a top wall, wherein said air outlet opening is located within said top wall.

13. The humidifier of claim 12, wherein said blower is a fan mounted within said cover above said wicking element.

14. The humidifier according to claim 3, wherein said housing includes a wick support column, wherein a bottom edge of one of said wicking element portions rests against a side of said wick support column, and wherein a bottom edge of the other of said wicking element portions rests against a top of said wick support column.

15. A humidifier comprising:
    a housing defining a water reservoir, an air inlet opening and an air outlet opening;
    a generally V-shaped wicking element including first and second angularly spaced wicking element portions which are in fluid communication with said reservoir, said wicking element further including an uppermost portion; and
    a blower for causing air flow through said air inlet opening, through said wicking element, and through said air outlet opening, wherein said blower includes a motor which is mounted at least partially between said first and second wicking element portions and at least partially below said uppermost portion of said wicking element.

16. A humidifier/air purifier comprising:
- a housing defining a water reservoir, an air inlet opening and an air outlet opening;
- a generally V-shaped wicking element in fluid communication with said reservoir;
- a generally V-shaped air filter being removably mounted above and within said wicking element; and
- a blower for causing air flow through said air inlet opening, through said wicking element, through said air filter and through said air outlet opening.

17. The humidifier/air purifier of claim 16, wherein said wicking element includes first and second angularly spaced wicking element portions, wherein said air filter includes first and second angularly spaced air filter portions, and wherein said first and second air filter portions extend above and adjacent to said first and second wicking element portions, respectively.

18. The humidifier/air purifier of claim 16, wherein said air filter includes a single piece of pleated filter medium bent at an angle to form a generally V-shaped air-filter medium.

19. The humidifier/air purifier of claim 18, wherein said air filter includes a frame supporting said air filter medium.

20. The humidifier/air purifier of claim 19, wherein said frame has first and second end walls, and wherein said air filter medium has first and second lateral edges fixedly attached to said first and second end walls, respectively.

21. The humidifier/air purifier of claim 20, wherein said first and second lateral edges are glued to said first and second end walls.

22. The humidifier/air purifier of claim 20, wherein said frame includes a top wall that extends between said end walls and that has therein an opening to allow air to flow out of said air filter.

23. The humidifier/air purifier of claim 20, wherein said air filter medium includes first and second angularly spaced air filter medium portions formed by a single piece of pleated air filter medium bent at an angle.

24. The humidifier/air purifier of claim 20, wherein said end walls are generally triangular.

25. The humidifier/air purifier of claim 16, wherein said housing further includes a cover and a top wall, wherein said outlet opening is located within said top wall.

26. The humidifier/air purifier of claim 25, wherein said blower includes a fan which is mounted above said air filter.

27. The humidifier/air purifier of claim 16, wherein said blower includes a motor mounted within said wicking element and said air filter.

28. The humidifier/air purifier of claim 16, wherein said housing includes a base defining said air inlet opening, said humidifier/air purifier further comprising an air flow plenum which extends between said air inlet opening and said air outlet opening, and which is defined in part by generally parallel first and second side walls, wherein each side wall has a lower end removably attached to said base.

29. A humidifier comprising:
- a housing defining a water reservoir, an air inlet opening, and an air outlet opening;
- a single, generally V-shaped wicking element including first and second angularly spaced wicking element portions which are in fluid communication with said reservoir; and
- a blower for causing air flow through said air inlet opening, through said wicking element, and through said air outlet opening.

30. The humidifier according to claim 29, wherein said housing includes a base defining said reservoir, said air inlet opening and a second air inlet opening, wherein said reservoir is between said air inlet openings, and wherein said first and second wicking element portions extend above said first-mentioned and second air inlet openings, respectively.

31. The humidifier according to claim 29, wherein said wicking element portions are substantially identical and each includes a frame surrounding a wicking medium.

32. The humidifier according to claim 29, further comprising an air filter mounted above said wicking element.

33. The humidifier according to claim 32, wherein said air flow follows a path through said air inlet opening, said wicking element, said air filter, and said air outlet opening.

34. The humidifier according to claim 29, wherein said housing includes a base defining said air inlet opening and said reservoir, said humidifier further comprising an air flow plenum which extends between said air inlet opening and said air outlet opening, in which said wicking element is located, and which is defined in part by generally parallel first and second side walls, and wherein each side wall has a lower end removably attached to said base.

35. The humidifier according to claim 29, wherein said housing further includes a cover and a top wall, wherein said air outlet opening is located within said top wall.

36. The humidifier according to claim 29, further comprising a support member mounted within said housing and above said wicking element, said support member including at least one aperture to allow air to pass therethrough, wherein said blower includes a motor positioned above said support member, and said blower causes air to flow through said support member.

37. The humidifier according to claim 36, wherein said support member further includes a recess, such that said motor is positioned within said recess, and within said wicking element.

38. The humidifier according to claim 36, further comprising a generally V-shaped air filter mounted above said wicking element and below said support member.

39. The humidifier according to claim 38, wherein said air filter comprises a V-shaped air filter medium and a frame supporting said air filter medium, said frame including first and second end walls and a top wall that extends between said end walls, said top wall including an opening to allow air to flow out of said air filter.

40. The humidifier according to claim 39, further comprising a first wall and a second wall mounted within said housing, wherein opposite ends of said top wall of said air filter frame rest on said first wall and said second wall, respectively.

41. The humidifier according to claim 36, wherein said support member includes first and second downwardly projecting ribs which respectively contact said first and second wicking element portions to form a substantially air-tight seal between said wicking element portions and said support member.

42. The humidifier according to claim 38, wherein said housing further includes a base defining said air inlet opening and said reservoir, wherein said humidifier further includes a cylindrical wall which extends between said support member and a top wall of said housing, said humidifier further comprising an air flow plenum, in which said wicking elements and said air filter are located, which extends between said air inlet opening and said air outlet opening, and which is defined in part by said housing, said support member, said cylindrical wall, and generally parallel first and second side walls of said housing which are arranged to support said air filter.

43. The humidifier according to claim 42, wherein each side wall has a bottom end removably attached to said base.

44. A humidifier comprising:
- a housing defining a water reservoir, a first air inlet opening adjacent to one side of said water reservoir, a second air inlet opening adjacent to an opposite side of said water reservoir, and an air outlet opening;
- a wicking element having first and second angularly spaced wicking element portions, said wicking element further having a lower portion which is in fluid communication with said reservoir, wherein said first wicking element portion extends upwardly from said water reservoir and over said first air inlet opening, and wherein said second wicking element portion extends upwardly from said water reservoir and over said second air inlet opening; and
- a blower for causing air flow through said first and second air inlet openings, through said wicking element, and through said air outlet opening.

45. The humidifier according to claim 44, wherein said first wicking element portion extends further into said reservoir than said second wicking element portion.

46. The humidifier according to claim 45, wherein each of said wicking element portions has a lower end and extends at an angle of approximately thirty degrees from vertical, and wherein said lower end of said first wicking element portion extends below said lower end of said second wicking element portion.

47. A humidifier comprising:
- a housing defining a water reservoir, an air inlet opening, and an air outlet opening;
- a wicking element including first and second angularly spaced, substantially identical wicking element portions, each wicking element portion having a frame surrounding a wicking medium, and each wicking element portion being independently replaceable within said humidifier; and
- a blower for causing air flow through said first and second air inlet openings, through said wicking element, and through said air outlet opening.

48. The humidifier according to claim 47, wherein said housing includes a wick support column, wherein a bottom edge of one of said wicking element portions rests against a side of said wick support column, and wherein a bottom edge of the other of said wicking element portions rests against a top of said wick support column.

* * * * *